United States Patent [19]

Hamasaki

[11] Patent Number: 4,895,135
[45] Date of Patent: Jan. 23, 1990

[54] SELF-HEATING CONTAINER

[75] Inventor: Masafumi Hamasaki, Tokorozawa, Japan

[73] Assignees: Fukubi Kagaku Kogyo Kabushiki Kaisha, Fukui; Chori Company, Ltd., Osaka; Hama Corporation Co., Ltd., Saitama, all of Japan

[21] Appl. No.: 227,254

[22] Filed: Aug. 2, 1988

[30] Foreign Application Priority Data

| Aug. 10, 1987 | [JP] | Japan | 62-122417[U] |
| Aug. 10, 1987 | [JP] | Japan | 62-122418[U] |
| Oct. 12, 1987 | [JP] | Japan | 62-154738[U] |
| Feb. 8, 1988 | [JP] | Japan | 63-14633[U] |

[51] Int. Cl.$^4$ .................................. F24J 1/00
[52] U.S. Cl. .................................. 126/263; 126/261; 206/222
[58] Field of Search ............... 126/263, 261, 262, 246; 206/219, 222; 44/3.3; 62/4; 426/109, 113, 114

[56] References Cited

U.S. PATENT DOCUMENTS

| 3,683,889 | 8/1972 | Hoffman | 126/263 |
| 3,970,068 | 7/1976 | Sato | 126/263 |
| 4,391,366 | 7/1983 | Hirata | 220/462 X |
| 4,559,921 | 12/1985 | Benmussa | 126/263 |
| 4,762,113 | 8/1988 | Hamasaki | 126/263 |
| 4,771,761 | 9/1988 | Doukhan et al. | 126/263 |
| 4,773,389 | 9/1988 | Hamasaki | 126/263 |

Primary Examiner—Randall L. Green
Attorney, Agent, or Firm—Wenderoth, Lind & Ponack

[57] ABSTRACT

A self-heating container is capable of generating heat by hydration of an exothermic rection agent and includes an outer shell, an envelope enclosing the exothermic reaction agent, a water bag filled with water for reaction with the agent, and a container body for containing foodstuff. The container body is formed of a sheet member including a metal foil and a synthetic resin layer attached on at least one side of the metal foil. The sheet member is folded to have a W-shaped cross section and is heat-sealed along the vertical and upper edges. The inverted V-shaped portion of the folded sheet defines a chamber for accommodating the envelope outside the container body.

13 Claims, 7 Drawing Sheets

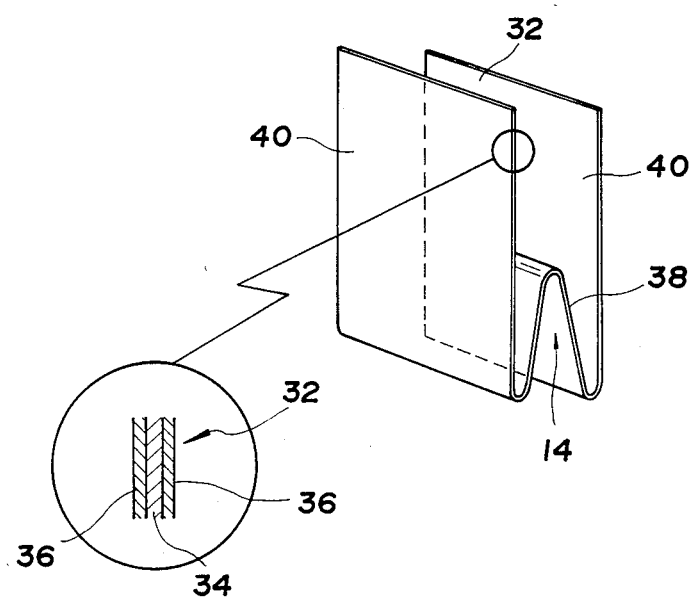
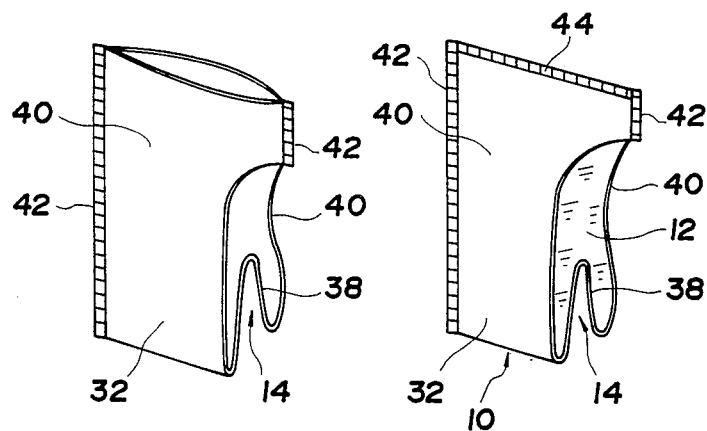

SELF-HEATING CONTAINER

BACKGROUND OF THE INVENTION

1. Field of the Invention

The present invention relates to a self-heating container using an exothermic reaction agent for heating a contained foodstuff in the form of liquid or including a liquid substance without the supply of external thermal energy.

2. Description of the Prior Art

Various types of self-heating containers are known for heating the contents (mainly foodstuffs by heat of hydration between an exothermic reaction agent such as quicklime and water. One essential requirement in this kind of container is the capability of heating up the contents to a desired temperature with an easy operation and without any danger. Another important requirement is that the contents, particularly a foodstuff, be perfectly separated from the agent and never contaminated with the agent during storage and reaction. It is also important to ensure that the agent does not start reaction with the water until so desired.

A self-heating container that fulfills the above requirements is disclosed in U.S. Pat. No. 4,640,264 partly owned by the inventor herein. The container disclosed therein has been embodied and sold in Japan as containing Japanese sake and has become one of the most commercially successful self-heating containers. FIG. 1 schematically illustrates such a container which has a body 1 for containing a foodstuff 2 therein, the upper end of body 1 being closed by an upper cover 3. A can 4 is housed within the body 1 to confine a chamber 5 in which is arranged an exothermic reaction agent 6 together with a water bag 7. The lower end of can 4 has an outwardly extending flange curled to the lower edge of body 1, and the chamber 5 is closed by a partition 8 which rests on a lower cover 9 also curled to the lower edge of body 1. When it is desired to heat up the foodstuff 2, a sharp member such as a pin is used to rupture the bag 7 through the lower cover 9 and partition 8 whereby water is discharged to mix with the agent 6 for hydration.

The body 1 is made of composite material comprising a paper substrate and a synthetic resin layer coated thereon. The can 4 has to be heat conductive and is formed of metal material such as aluminum sheet, and the partition 8 is also formed of metal for resisting the hydration reaction and resultant heat. Further, in the container as actually sold the upper cover 3 is also of aluminum. It may be appreciated that use of these composite and metal materials substantially increase the manufacturing cost of the container. Additionally, the can 4 is formed by deep drawing of a metal sheet and is fixed to the body 1 by curling, involving difficult operations which also increase the manufacturing cost.

It is therefore an object of the present invention to provide a self-heating container which can be manufactured by simple operations and at low cost.

Another object of the invention is to provide a self-heating container in which heat generated by hydration may be efficiently transmitted to contents with minimum energy loss.

Still another object of the invention is to provide a self-heating container which can be stored or preserved for a long period of time without deterioration of an exothermic reaction agent.

A further object of the invention is to provide a self-heating container in which hydration may be effected by a simple operation.

SUMMARY OF THE INVENTION

According to the invention, a self-heating container includes an outer shell member, an envelope disposed in the outer shell member and enclosing an exothermic reaction agent for generating heat by hydration, and a water bag also disposed in the outer shell member and filled with water for reaction with the exothermic reaction agent. Also housed within the outer shell member is a container body for containing a foodstuff and which is formed of a sheet member comprising a metal foil and a synthetic resin layer attached on at least one side of the metal foil. The sheet member is formed to have a substantially W-shaped cross section and is heat-sealed at least along the vertical edges and upper edges by the synthetic resin layer. An inverted V-shaped portion of the sheet member defines outside of the container body a chamber for accommodating the envelope therein.

With the above structures the entire container can be manufactured at low material cost. All that are necessary for making the container body are folding and heat-sealing operations of the sheet member, and the container body advantageously defines the chamber for the envelope. The metal foil of the sheet member can efficiently transmit heat to the foodstuff over the entire surface of container body.

The sheet member may comprise either a continuous single blank or separate two or more blanks. In the latter case, the blanks are arranged substantially into the W-shape prior to the heat-sealing operation.

Other objects, features and advantages of the invention will be apparent from the following detailed description of preferred embodiments thereof when taken in conjunction with the accompanying drawings.

BRIEF DESCRIPTION OF THE DRAWINGS

FIG. 3 is a perspective view illustrating a sheet member prior to heat-sealing;

FIGS. 4 and 5 are partly broken perspective views showing different stages of manufacture of a container body;

DESCRIPTION OF THE PREFERRED EMBODIMENTS

Figure 1:
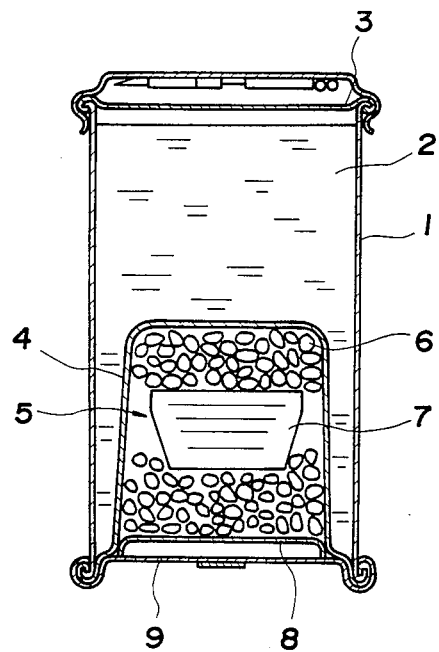
FIG. 1 is a longitudinally sectioned view showing a self-heating container of the prior art.
Figure 2:
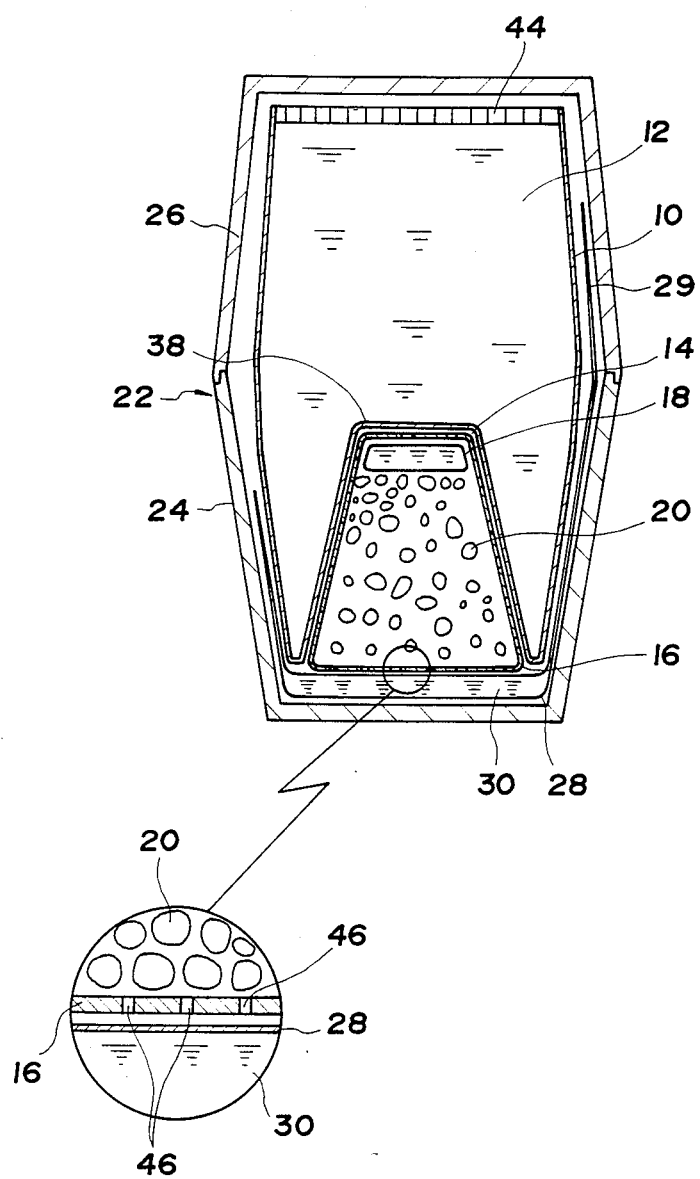
FIG. 2 is a sectional view of a self-heating container according to an embodiment of the present invention.
Figure 6:
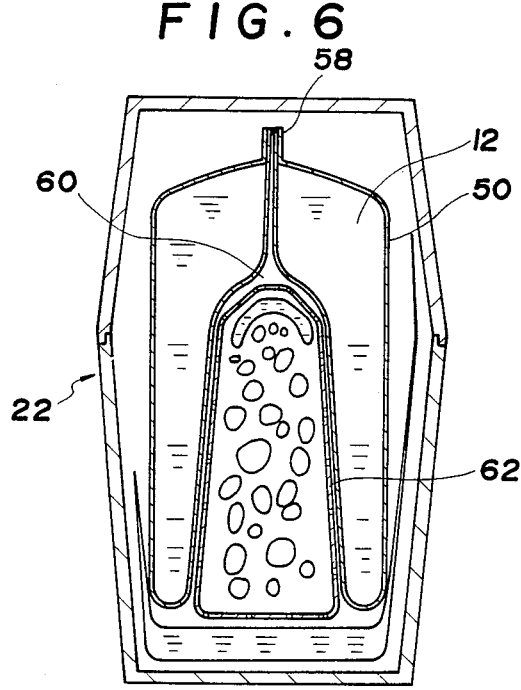
FIG. 6 is a sectional view of a self-heating container according to another embodiment of the invention.

Referring first to FIG. 2 of the drawings, a self-heating container includes a container body 10 which is shown as being filled with a liquid foodstuff 12. The lower end or bottom of container body 10 has an upwardly projecting portion to define outside the body 10 a chamber 14 having a lower open end. Fitted in the chamber 14 is an envelope 16 enclosing a secondary water bag 18 and an exothermic reaction agent 20 adapted to generate heat through hydration. An outer shell 22, preferably made of foamed plastic, is provided to house the container body 10 with the envelope 16 therein and comprises a lower half or a receptacle part 24 and an upper half or a cover part 26 which are coupled together in a detachable manner such as threaded engagement. Between the outer shell 22 and the container body 10 is disposed an elongated primary water bag 28 containing a predetermined amount of water 30 and one end of which extends along the inner surface of outer shell 22 to a position above the junction where the upper and lower halves 24 and 26 are joined together.

The container body 10 is made from a continuous sheet material as shown in FIGS. 3 through 5. A sheet material 32 used comprises a metal foil 34 such as aluminum which has adhered to both sides thereof layers 36 of synthetic resin such as polyethylene. The oblong sheet 32 is so folded that a vertical section thereof is in a shape similar to letter W with a substantially i V-shaped portion 38 between opposite side 40. The sheet thus folded is then subjected to a heat sealing operation along its vertical edges 42 as seen from FIG. 4. The heat adheres together the inner surfaces of the sides 40, the inner surface of each side 40 and each inner surface of the portion 38, and the outer surfaces of the portion 38 at the vertical edges 42 so as to form a bag having an upper open end and defining the chamber 14 which is sealed at both sides or edges. After the bag is filled with the foodstuff 12, the upper edges 44 of sides 40 are heat-sealed together to thereby complete the container body 10 (FIG. 5).

The chamber 14 defined by the inverted V-shaped portion 38 is slightly expanded by manual operation to permit the envelope 16 to be fitted and retained therein. The envelope 16 is permeable to water at at least its bottom wall facing the primary water bag 28 so that water discharged from the latter may enter the inside of envelope 16, as described hereinafter. In the illustrated embodiment the envelope 16 is made from a sheet material similar to the sheet 32 from which the container body 10 is made, and is provided with numerous small holes 46 over its entire surface. The exothermic reaction agent 20 contained in the envelope 16 may preferably comprise quick lime in the form of agglomerates, which is economical and generates relatively large heat energy during hydration. The secondary water bag 18 may be formed of synthetic resin film which can melt by the heat of hydration caused by water 30 from the primary bag 28. However, it is more preferable to form the secondary bag 18 of a material similar to the material 32 of the container body 10, which material can perfectly prevent exudation of the water and therefore prevent pre-reaction of the agent 20 during storage of the container. The bag 18 of such material is rupturable at a sealed portion by an internal pressure which is increased when the bag is heated. As illustrated in FIG. 2, the secondary bag 18 is positioned at the top of the envelope 16, i.e. above the agent 20.

The primary bag 28 is made of polyethylene or other suitable plastic film and has a notch (not shown) which is formed between both ends to facilitate rupture of the bag 28. The notch is surrounded by a sealed line or portion so as to prevent the water 30 from leaking out through the notch.

When it is desired to heat the foodstuff 12, the cover 26 of outer shell 22 is removed from the receptacle 24 to expose one end 29 of the primary bag 28 as well as the upper portion of container body 10. By pulling the one end 29 away from the receptacle 24, the primary bag 28 is ruptured along the notch to discharge the water 30 which enters into the envelope 16 through the holes 46 and reacts with the agent 20. This hydration reaction generates heat which is transmitted to the foodstuff 12 through the envelope 16 and the container body 10 including inverted V-shaped portion 38. As the temperature in the envelope 16 becomes higher the internal pressure of the secondary bag 18 increases, followed by rupture of the bag 18 so that the water therein is discharged over the agent 20 to effect hydration with that portion thereof which is not yet reacted with the water 30 from the primary bag 28. The reaction continues until the entire amount of agent 20 is hydrated to heat up the foodstuff 12 to a predetermined temperature. Thereafter, a consumer may dispense the foodstuff 12 by removing the upper sealed edge 44 of the container body 10.

Provision of the secondary bag 18 is preferable but not essential in the present invention. If the amount of agent 20 is small, then the water 30 in the primary bag 28 will be sufficient and the secondary bag 18 may be omitted.

As will be understood from the foregoing description, the container body 10 for accommodating the foodstuff 12 is manufactured from the sheet material 32 and the chamber 14 is defined by the container body 10 without using any other material such as aluminum plate which has been used in the prior art container. Further, the container body 10 can be easily formed, while defining the chamber 14, by means of heat-sealing techniques Thus, the entire container of the invention will be economical compared with the prior art container.

Figure 7:
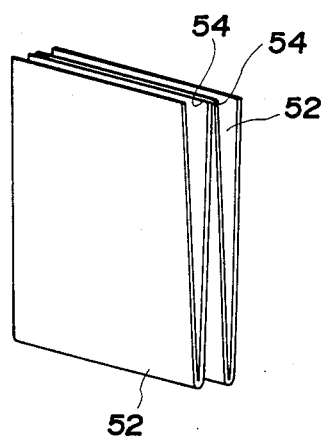
FIG. 7 is a perspective view showing two folded blanks constituting a sheet member from which a container body of FIG. 6 is made.
Figure 8:
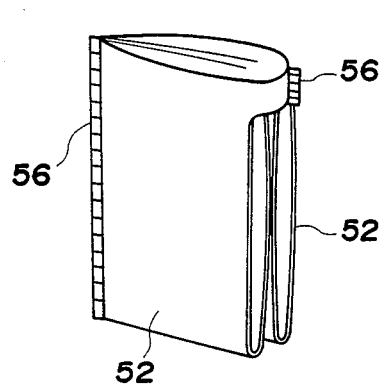
FIGS. 8 and 9 are partly broken perspective views for use in explanation of manufacture of the container body.
Figure 9:
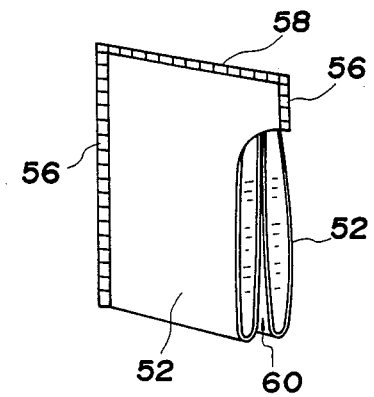

FIGS. 6 to 9 illustrate a modified form of container body housed within the outer shell 22. This container body 50 is made from a pair of oblong sheets 52 each consisting of the metal foil and synthetic resin layers adhered to both sides thereof as in the sheet 32 above. After each sheet 52 is folded into a shape similar to letter V or U, the two sheets are arranged such that their upper inner edges 54 overlap with each other to form a substantially W-shaped configuration (FIG. 7). Then the four vertical edges of the two sheets 52 are joined together by a heat-sealing operation at each side 56 with the opposite inner surfaces of each sheet being adhered together while the facing outer surfaces of the two sheets 52 are also adhered together, resulting in a pair of bags having upper open ends (FIG. 8). After each bag is filled with the foodstuff 12, the four upper edges including the edges 54 are adhered together by heat-sealing at 58 for completing the container body 50 (FIG. 9). A chamber 60 is defined between the facing outer surfaces of the sheets 52 and between the sealed vertical edges 56 to accommodate an envelope 62 similar to the envelope 16 in FIG. 2.

Figure 10:
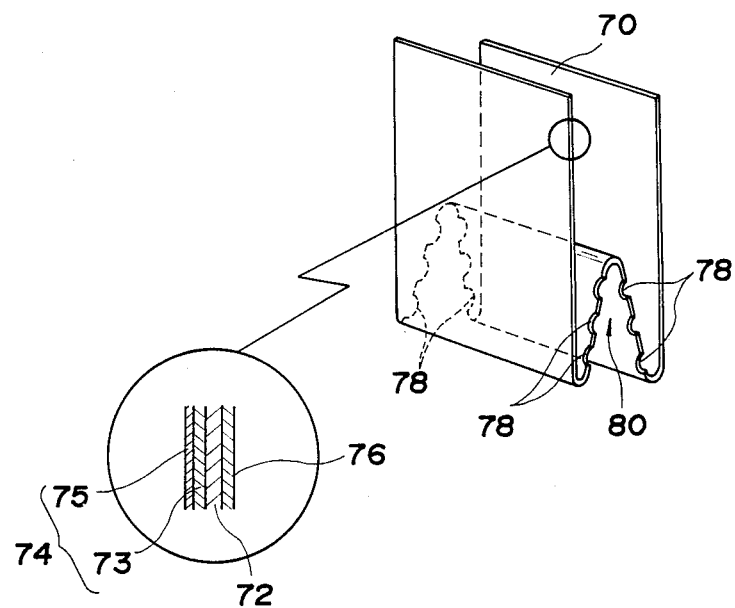
FIG. 10 is a perspective view showing another example of the sheet member.

Another modification of the container body is shown in FIG. 10 prior to heat-sealing. An oblong sheet 70 used for manufacture of the container body comprises a metal foil 72, a first synthetic resin layer 74 adhered to one surface thereof and a second synthetic resin layer 76 adhered to the other surface thereof. The first layer 74 is formed of a material having a melting point higher than a material of the second layer 76 and, in the illustrated example, the layer 74 consists of an intermediate layer 73 formed of polyethylene terephthalate or nylon and a surface layer 75 of polypropylene while the second layer 76 is formed of polyethylene having a melting point lower than that of polypropylene. If desired, the first layer 74 may be a single layer structure as long as it has a melting point higher than that of the second layer 76.

A plurality of recesses 78, each of a semicircular shape in plan view, are provided at opposite longitudinal edges in the middle portion of sheet 70. As shown in FIG. 10, the sheet 70 is folded in the manner already described with reference to FIG. 3 and in such a manner that the second layer 76 is on the inner side of the folded sheet and the recesses 78 are aligned on the vertical edges of an inverted V-shaped portion which defines a chamber 80. Then the sheet 70 is subjected to a heat-sealing operation along the entire vertical edges thereof by using suitable tools such as roller means. The temperature of the heat applied to sheet edges, i.e. the temperature of the roller means, is controlled to be higher than the melting point of polyethylene inner layer 76 and to be lower than that of the outer layer 74 (surface layer 75 in this example) so that only the inner layer 76 melts to permit the inner surfaces of sheet 70 to be adhered together, It should be noted that the inner surfaces of the opposite sides are adhered together through the aligned recesses 78 even at the inverted V-shaped portion. Therefore, although the outer surfaces of the inverted V-shaped portion are not adhered together, the chamber 80 is confined at both lateral ends to hold the envelope therein. The outer layer having the higher melting point is advantageous because it does not adhere to the roller means during heat-sealing, resulting in an increased efficiency in manufacture.

Figure 11:
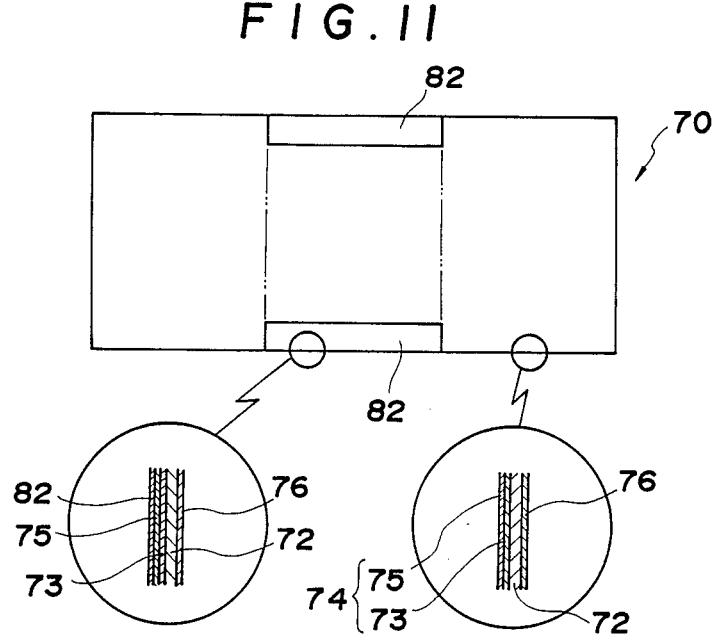
FIG. 11 is a plan view illustrating still another example of the sheet member.
Figure 12:
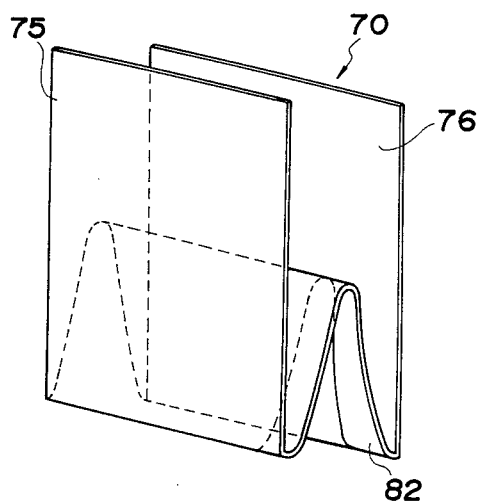
FIG. 12 is a perspective view of the sheet member in FIG. 11 in a folded state.

Instead of providing the recesses, the inverted V-shaped portion may be provided with a melting layer on the outer surface thereof. An example of such sheet material is illustrated in FIG. 11 in which a melting layer 82 of polyethylene is coated upon the surface layer 75 along each longitudinal edge at a portion forming the inverted V-shaped portion. The melting layer may be coated on the entire outer surface of that portion, if so desired. After the sheet 70 is folded into the shape shown in FIG. 12, the vertical edges are subjected to the heat-sealing operation at a temperature to permit only the polyethylene layers 76 and 82 to melt for adhesion. This results in a bag having an upper open end and confining a chamber which is closed at both lateral ends due to co-adhesion of the layers 82.

Figure 13:
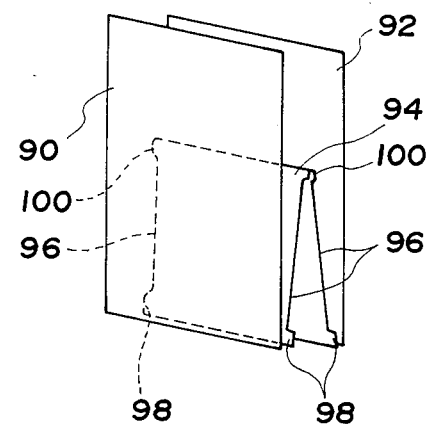
FIG. 13 is also a perspective view showing a further example of the sheet member comprising three blanks.

A container body illustrated in FIG. 13 (prior to heat-sealing) is made from three sheet materials 90, 92 and 94 one of which, i.e. 94, is folded in an inverted V-letter shape and is arranged between the other sheets 90 and 92. Each of the three sheets has the multi-layered structure as in the sheet 70 of FIG. 10. The sheet 94 to be folded has an elongated recess 96 formed along each longitudinal edge thereof except both ends 98 and a center portion 100, and is folded at the center portion 100 with the polyethylene layer facing the other sheets 90 and 92. For forming a bag, heat-sealing is effected along the lower edges of the sheets as well as along the opposite vertical edges thereof, resulting in the lower edges including the ends 98 of sheet 94 being adhered to the lower edges of respective sheets 90 and 92 while the vertical edges of sheets 90 and 92 are adhered together through the recesses 96. Because the lower edges of sheet 94 are not adhered together due to the layer having the higher melting point, the resultant bag defines a downwardly opened chamber for the envelope.

In the container bodies shown in FIGS. 10 and 13, it is not essentially necessary that the sheet materials have synthetic resin outer layers. If desired, a sheet material having only the inner layer may be used provided that it has a sufficient strength.

Figure 14:
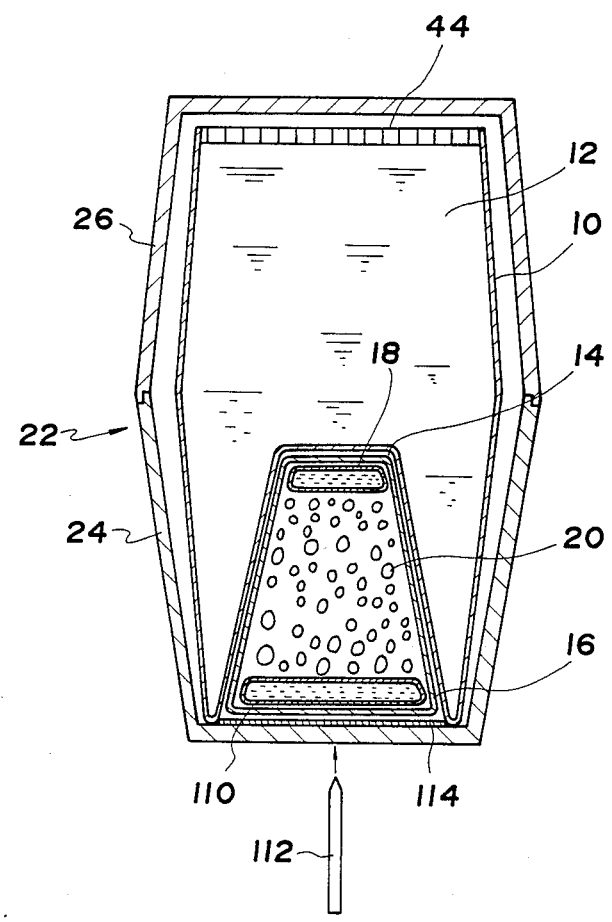
FIG. 14 is a sectional view of a self-heating container according to still another embodiment of the invention.

A self-heating container illustrated in FIG. 14 is similar to that of FIG. 2 and, therefore, the same or corresponding parts are indicated by the same reference numerals. In this embodiment, a primary water bag 110 is also enclosed in the envelope 16 and is adapted to be ruptured by a needle member such as a pin 112. The primary bag 110, as well as the secondary bag 18, is formed of a sheet material similar to the sheet 32 from which the container body 10 is made. The primary bag 110 is located at the lower end portion in the envelope 16, i.e. below the agent 20. The lower open end of chamber 14 is closed by a cover plate 114 which is made of paperboard for example and which preferably has formed therethrough a pair of crossed slits (not shown) to facilitate insertion of the pin 112. When heating the foodstuff 12 in container body 10, the pin 112 is forced through the outer shell 22 and cover plate 114 into the envelope 16 to rupture the primary bag 110. Water discharged therefrom reacts with the agent 20 while generating heat which finally ruptures the secondary bag 18, as already described hereinbefore.

Although the invention has been described with reference to preferred embodiments thereof, many modifications and alterations may be made within the spirit of the invention.

What is claimed is:

1. A shelf-heating container comprising:
   an outer shell member;
   an envelope disposed in said outer shell member and enclosing an exothermic reaction agent for generating heat by hydration;
   water bag means disposed in said outer shell member and filled with water for reaction with said exothermic reaction agent, said water bag means comprising a primary bag and a secondary bag, said primary bag being elongated and disposed between the bottom of said outer shell member and said envelope, and said secondary bag being housed in said envelope; and
   a container body housed within said outer shell member for containing foodstuff, said container body being formed of a sheet member comprising a metal foil and a synthetic resin layer attached on at least one side of said metal foil, said sheet member being folded to have a substantially W-shaped cross section and heat-sealed at least along the vertical edges and upper edges by said synthetic resin layer, and an inverted V-shaped portion of the folded sheet member defining outside said container body a chamber for accommodating said envelope therein.

2. A self-heating container as claimed in claim 1, wherein said sheet member comprises a continuous single blank folded substantially into the W-shape.

3. A self-heating container as claimed in claim 1, wherein said sheet member comprises two blanks, each blank being folded substantially into a V-shape, and wherein said W-shaped cross section is formed by combining the folded two blanks at the upper inner edges thereof.

4. A self-heating container as claimed in claim 1, wherein said sheet member comprises three blanks one of which is folded substantially into an inverted V-shape, and wherein said sheet member also is heat-sealed along lower edges thereof.

5. A self-heating container as claimed in claim 1, wherein said primary bag has formed therein a notch to permit a rupture of said primary bag upon a pull of one end thereof.

6. A self-heating container as claimed in claim 1, wherein said secondary bag is formed of a multi-layered sheet material comprising a metal foil and a synthetic resin layer attached on each side of said metal foil.

7. A self-heating container as claimed in claim 1, wherein said envelope has permeability to water on at least the lower surface thereof facing said primary bag.

8. A self-heating container as claimed in claim 1, wherein said outer shell member comprises a receptacle and a cover removably secured to said receptacle.

9. A self-heating container as claimed in claim 1, wherein said metal foil has synthetic resin layers are attached on opposite sides thereof.

10. A self-heating container as claimed in claim 9, wherein said synthetic resin layers are formed of the same material, and wherein the surfaces defining said chamber are adhered together at the vertical edges.

11. A self-heating container as claimed in claim 9, wherein said synthetic resin layers are formed of materials having different melting points, and wherein said sheet member is folded in such a manner that said synthetic resin layer having the lower melting point constitutes the inner surface.

12. A self-heating container as claimed in claim 11, wherein said inverted V-shaped portion has formed at the vertical edges recesses to permit the opposite inner surfaces of the folded sheet member to adhere together therethrough.

13. A self-heating container as claimed in claim 11, wherein said sheet member further comprises an additional layer formed of the material having the lower melting point, said additional layer being provided on at least the vertical edges of the outer surface of said inverted V-shaped portion to cover the higher melting point layer.

* * * * *